(12) United States Patent
Sean et al.

(10) Patent No.: US 8,415,905 B2
(45) Date of Patent: Apr. 9, 2013

(54) BATTERY POWER SYSTEM

(75) Inventors: Wu-Yang Sean, Hsinchu (TW); Yi-Hsien Chiang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 215 days.

(21) Appl. No.: 13/098,029

(22) Filed: Apr. 29, 2011

(65) Prior Publication Data

US 2012/0133309 A1    May 31, 2012

(30) Foreign Application Priority Data

Nov. 25, 2010 (TW) .............................. 99140766 A

(51) Int. Cl.
    *H02P 7/00* (2006.01)
(52) U.S. Cl.
    USPC ........... 318/139; 318/109; 318/254; 318/801; 307/77
(58) Field of Classification Search .................. 318/109, 318/139, 254, 801; 307/9.1, 77
    See application file for complete search history.

(56) References Cited

U.S. PATENT DOCUMENTS

| | | | |
|---|---|---|---|
| 4,672,294 A | 6/1987 | Norton | |
| 5,316,868 A | 5/1994 | Dougherty et al. | |
| 5,373,195 A * | 12/1994 | De Doncker et al. | 307/45 |
| 5,549,984 A | 8/1996 | Dougherty | |
| 6,057,666 A | 5/2000 | Dougherty et al. | |
| 6,323,608 B1 | 11/2001 | Ozawa | |
| 6,744,237 B2 | 6/2004 | Kopf et al. | |
| 7,186,473 B2 | 3/2007 | Shiue et al. | |
| 7,489,048 B2 * | 2/2009 | King et al. | 307/10.1 |
| 7,568,537 B2 * | 8/2009 | King | 180/65.1 |
| 7,595,597 B2 * | 9/2009 | King et al. | 318/139 |
| 8,026,638 B2 * | 9/2011 | King et al. | 307/77 |
| 8,026,691 B2 * | 9/2011 | Nagashima et al. | 318/801 |
| 8,120,290 B2 * | 2/2012 | King | 318/139 |
| 2006/0028778 A1 * | 2/2006 | O'Gorman et al. | 361/62 |
| 2007/0158118 A1 * | 7/2007 | King | 180/65.1 |

(Continued)

FOREIGN PATENT DOCUMENTS

| | | |
|---|---|---|
| TW | I271016 B | 1/2007 |
| TW | M331246 | 4/2008 |
| TW | 201021384 | 6/2010 |

OTHER PUBLICATIONS

Baek-Haeng Lee et al., The Dynamic Control of Hybrid Energy Storage System for Mild HEV, IEEE, 2007, p. 796-801.

(Continued)

*Primary Examiner* — Paul Ip
(74) *Attorney, Agent, or Firm* — Morris Manning & Martin LLP; Tim Tingkang Xia, Esq.

(57) ABSTRACT

A battery power system, adapted for driving a motor system of a power unit with respect to at least one power mode signal and at least one motor control signal generated from the motor system, which comprises: a battery pack, an electrolytic capacitor, a boost converter, a first contactor, a first switch, an ultracapacitor, a first diode, a second contactor, a second switch, a current limiting element, a plurality of measuring elements, and an electrical energy controller; wherein the electrical energy controller is enabled to analyze the electrical power level of the ultracapacitor according the power mode signal, the motor control signal and the voltage/current signals generated from the plural measuring elements while using the result of the analysis to control the current directions and conductivity of the boost converter, the first contactor, the second contactor, the first switch and the second switch so as to achieve a variety of control modes accordingly.

13 Claims, 5 Drawing Sheets

U.S. PATENT DOCUMENTS

| | | | |
|---|---|---|---|
| 2007/0164693 A1* | 7/2007 | King et al. | 318/109 |
| 2009/0033254 A1* | 2/2009 | Nagashima et al. | 318/139 |
| 2010/0090626 A1* | 4/2010 | King | 318/376 |
| 2010/0276993 A1* | 11/2010 | King | 307/9.1 |
| 2011/0037320 A1* | 2/2011 | King et al. | 307/45 |
| 2011/0316345 A1* | 12/2011 | King et al. | 307/77 |
| 2012/0038214 A1* | 2/2012 | King et al. | 307/77 |
| 2012/0038215 A1* | 2/2012 | Berry et al. | 307/77 |
| 2012/0038216 A1* | 2/2012 | Berry et al. | 307/77 |

OTHER PUBLICATIONS

Haifang Yu et al., Energetic Macroscopic Representation Based Modeling and Control for Battery/Ultra-capacitor Hybrid Energy Strorage System in HEV, IEEE, 2009, p. 1390-1394.

Jian Cao et al., A New Battery/Ultra-Capacitor Hybrid Energy Storage System for Electric, Hybrid and Plug-in Hybrid Electric Vehicles, IEEE, 2009, p. 941-946.

* cited by examiner

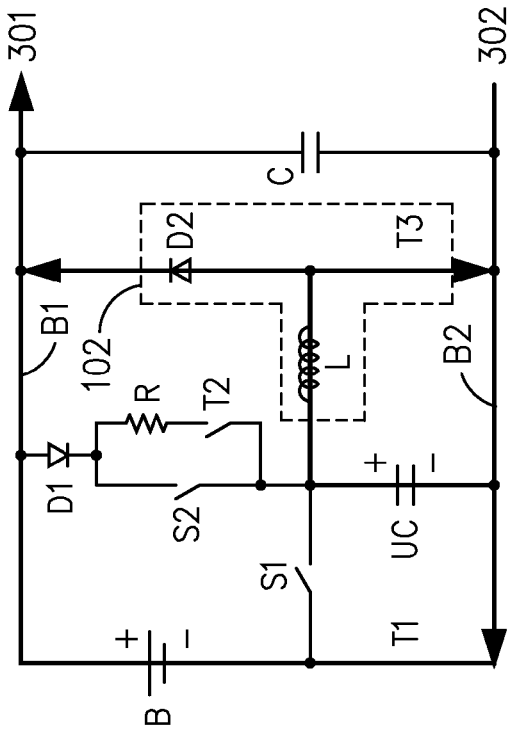
FIG. 8
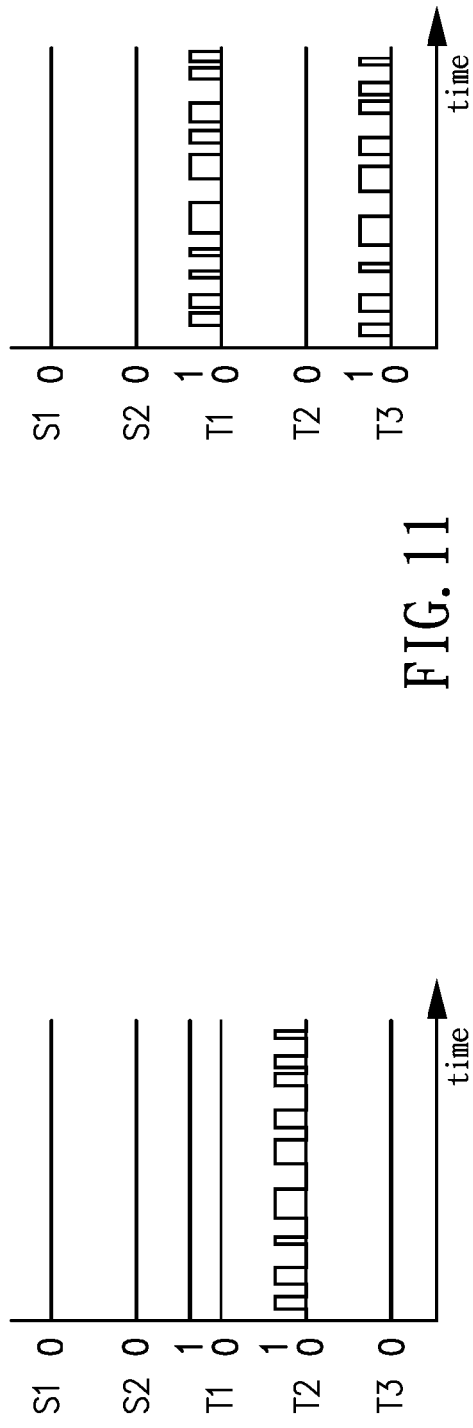
FIG. 9
FIG. 11
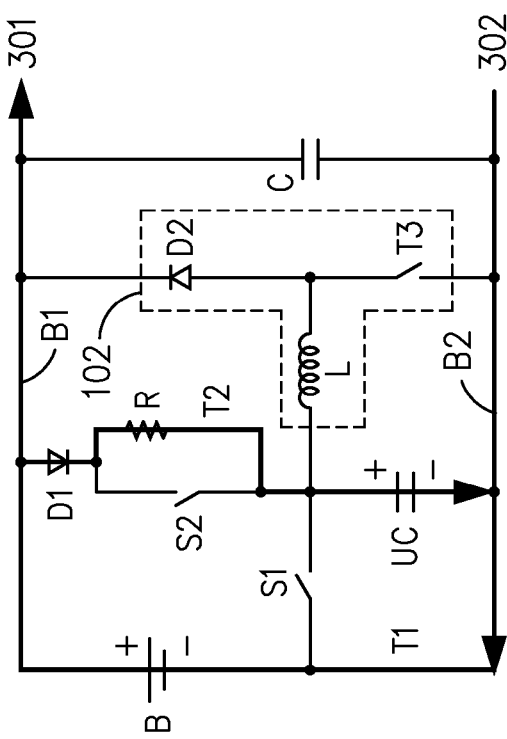
FIG. 10
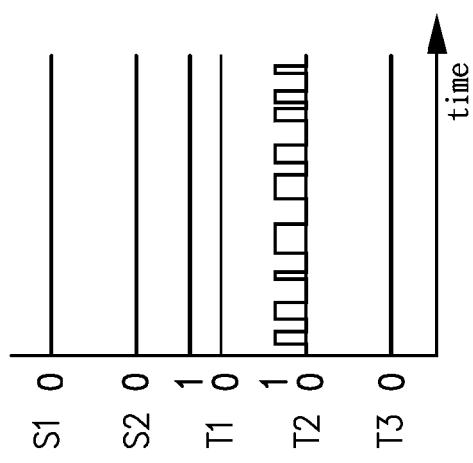

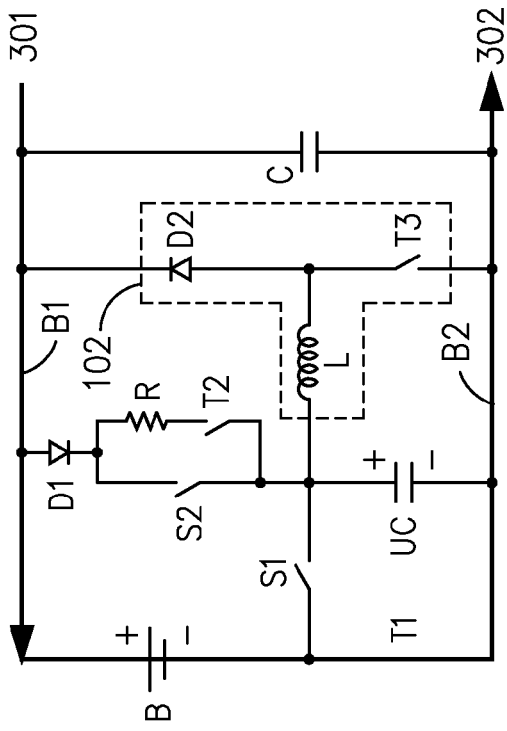
FIG. 12
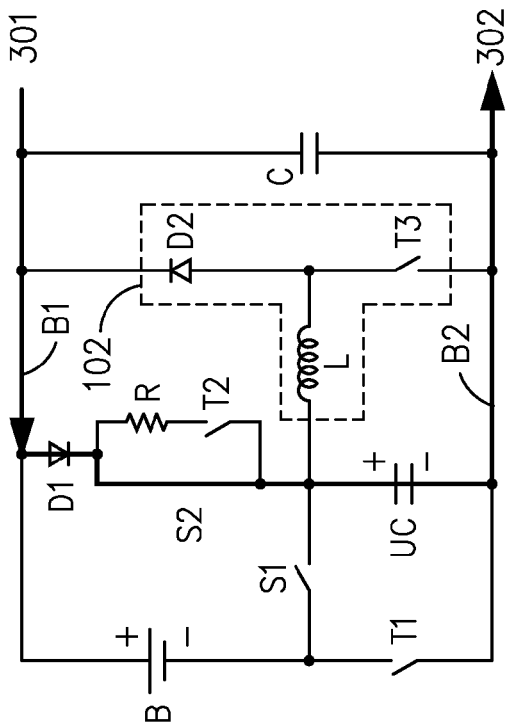
FIG. 14
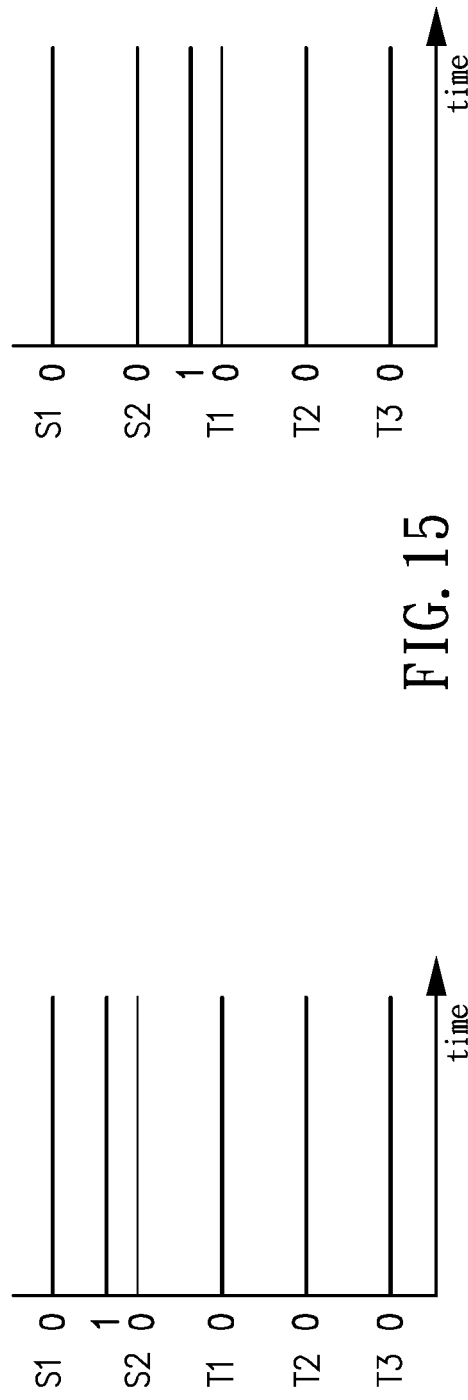
FIG. 13
FIG. 15

BATTERY POWER SYSTEM

CROSS-REFERENCE TO RELATED APPLICATION

This non-provisional application claims priority under 35 U.S.C. §119(a) on Patent Application No. 099140766 filed in Taiwan, R.O.C. on Nov. 25, 2010, the entire contents of which are hereby incorporated by reference.

TECHNICAL FIELD

The present disclosure relates to a battery power system, and more particularly, to uses the ultracapacitor and the power device with the lithium-ion cell.

TECHNICAL BACKGROUND

In recent years, a variety of power devices driven by the electronic power are continuously being created because the concept of the environmental protection is increased, for example, the development of the electronic vehicle industry. General speaking, the power source of the power device driven by the electronic power is the battery pack. Taking the electronic vehicle for an example, the cost of the battery pack used by the electronic vehicle is 750~1000 NT$/kwh (10 kw per hour), but the cell battery cycle life only has 800~1000 times. Moreover, taking an electronic postal vehicle, which uses the battery pack with 12 kwh has the endurance of 80 kilometer for an example, it supposes the cost of the electronic postal vehicle is same as other gasoline cars, and further calculates the amortization cost of the battery pack and the charging cost (at least NT$ 5/km) of the electronic postal vehicle. As a result, the every mileage driving cost of the electronic postal vehicle is more than the gasoline cars two-fold price, resulting in the amortization cost of the electronic postal vehicle is higher than the gasoline car. Additionally, the electronic postal vehicle must exchange the battery pack when it drives over 8 kilometers. Therese disadvantages hinder the market share of the electronic vehicle.

About the "long-lived cell battery", only Toshiba (SCiB) and Mitsubishi Electric (composite electrical storage devices) generate the cell battery cycle life having over 2000 times, wherein the composite electrical storage device having lithium cell serial connected with the ultracapacitor (14 Wh). However, the cost and the output of both still can not satisfy the demand.

The U.S. Pat. No. 7,489,048 with the title of "Energy storage system for electronic or hybrid vehicle" discloses a power storage system with two battery packs, a adjustable circuit serial/parallel connected the two battery packs and a external passive storage device serial connected with the power storage system via a interface. The control method of the patent is that when the motor is low-speed (below 50% rated), the two battery packs are parallel connected; when the motor is high-speed (upper 50% rated), the two battery packs are serial connected. Because this patent must mount two battery packs, the configuration of it is large, complicated and high-cost. Moreover, the system in the patent must perform two-steps power control according to the speed of the motor, and it can not adjust adaptive mode according to different states.

Regarding to the problems in power control of the battery pack mentioned above, it must spend a long-running time and high-cost to develop the long-life battery at the material. Therefore, it is important topic that how to generate a new way that is different with the new material development, and uses power management and control method to advance the cell battery cycle life, and effectively discharge and charge, and lower the amortization cost of the battery (at least not higher than the general gasoline car).

TECHNICAL SUMMARY

The present disclosure provides a battery power system, which uses the ultracapacitor and the power device with the lithium-ion cell to deign a new circuit used to switch to a circuit with serial connected structure or a circuit with parallel connected. The battery power system detects the voltages of the battery pack and the ultracapacitor to perform the current adjustment, and controls the discharge and charge according to a variety of states, such as, the discharge requirement is required when the power unit is driven, and the regenerative braking, so as to achieve high-effectively sharing of the load current, decrease the discharge depth of the battery and extend battery life.

In one embodiment, the present disclosure provides a battery power system adapted for driving a motor system of a power unit with respect to at least one power mode signal and at least one motor control signal generated from the motor system, the battery power system comprising: a battery pack, having a battery positive terminal coupled to a positive terminal of a direct current (DC) link and a battery negative terminal coupled to a negative terminal of the direct current (DC) link, and the battery pack is a rechargeable battery, and the battery positive terminal and the battery negative terminal are electrically coupled to the motor system; an electrolytic capacitor, coupled to the battery positive terminal and the battery negative terminal; a boost converter, coupled the battery positive terminal and the battery negative terminal, for boost converting the power; a first contactor, coupled to the battery negative terminal and the boost converter, and the first contactor has a on-state and a off-state; a first switch, coupled to the battery negative terminal and the negative terminal of the DC link, and the first switch has a on-state and a off-state; an ultracapacitor, having a positive terminal and a negative terminal, and the positive terminal of the ultracapacitor is coupled to the boost converter and the negative terminal of the ultracapacitor is coupled to the battery negative terminal; a first diode, coupled the positive terminal and the negative terminal of the ultracapacitor; a second contactor, coupled to the first diode and the positive terminal of the ultracapacitor, and the second contactor has a on-state and a off-state; a second switch, coupled to the first diode and the positive terminal of the ultracapacitor, and the second switch has a on-state and a off-state; a current limiting element, coupled to the second switch and the first diode; a plurality of measuring elements, for measuring at least one voltage value and at least one current value, and generating at least one voltage signal and at least one current signal; and a electrical energy controller, for receiving the power mode signal, the motor control signal, the voltage signal and the current signal, and analyzing the electrical power level of the ultracapacitor according the power mode signal, the motor control signal and the voltage/current signals generated from the plural measuring elements while using the result of the analysis to control the current directions and conductivity of the boost converter, the first contactor, the second contactor, the first switch and the second switch so as to achieve a variety of control modes accordingly.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 8 illustrates a schematic diagram of the configuration and current direction of the third mode in the present disclosure;

FIG. 9 illustrates a schematic diagram of the control signals of third mode in the present disclosure;

FIG. 10 illustrates a schematic diagram of the configuration and current direction of the fourth mode in the present disclosure;

FIG. 11 illustrates a schematic diagram of the control signals of fourth mode in the present disclosure;

FIG. 12 illustrates a schematic diagram of the configuration and current direction of the fifth mode in the present disclosure;

FIG. 13 illustrates a schematic diagram of the control signals of fifth mode in the present disclosure;

FIG. 14 illustrates a schematic diagram of the configuration and current direction of the sixth mode in the present disclosure; and FIG. 15 illustrates a schematic diagram of the control signals of sixth mode in the present disclosure.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
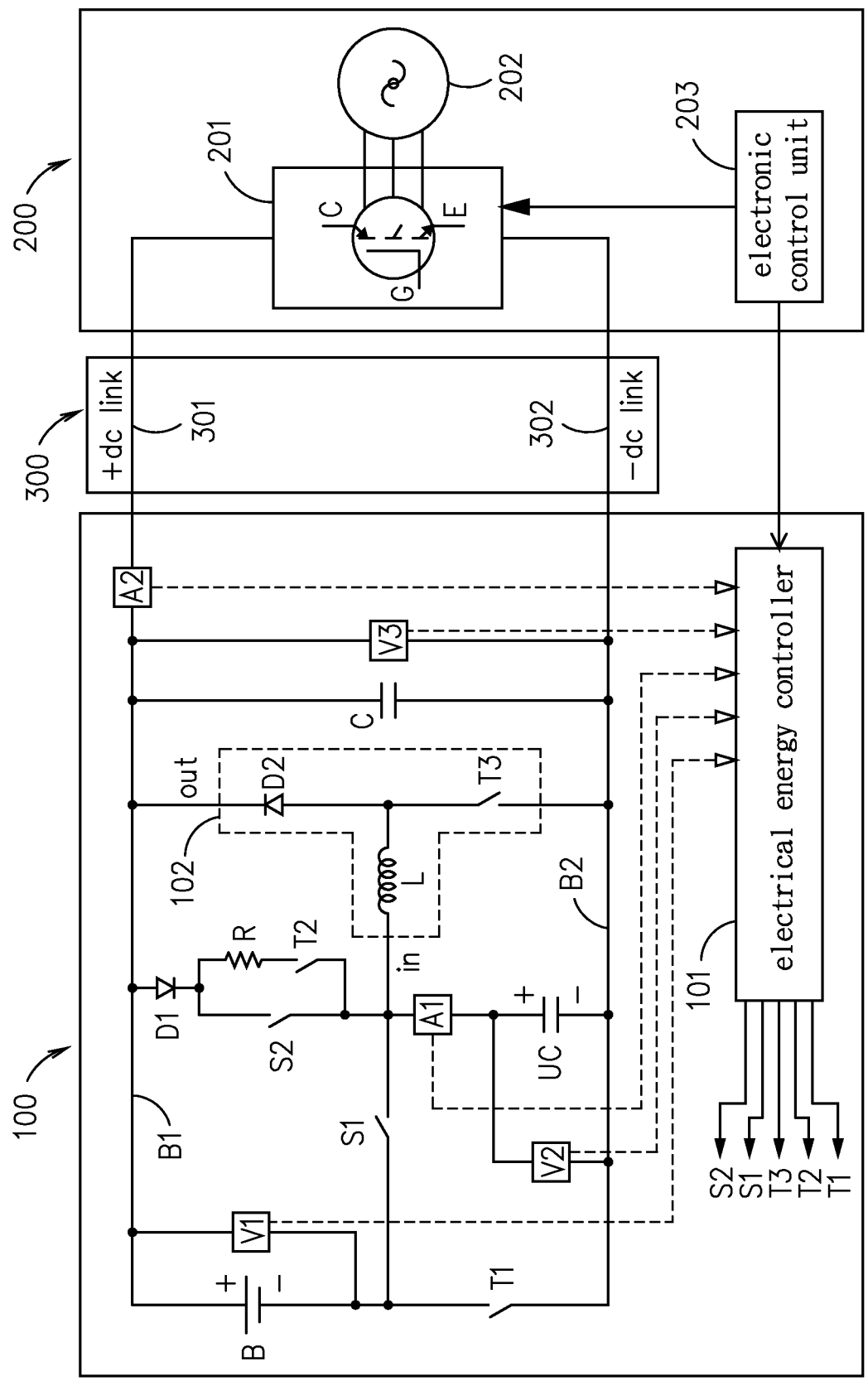
FIG. 1 is a schematic diagram showing a system configuration according to one embodiment of the present disclosure.

FIG. 1 is a schematic diagram showing a battery power system according to one embodiment of the present disclosure. The battery power system 100 is connected to a motor system 200 of a power unit through a terminal of the DC link 300, and drivers the motor system 200. The power unit is a power driven device, for example, an electric motor car. The terminals of the DC link 300 comprise a positive terminal 301 and the negative terminal 302, and the positive terminal 301 and the negative terminal 302 are electrically coupled to a frequency changer 201 in the motor system 202. The frequency changer 201 is coupled to a motor 202 and an electronic control unit 203. The electronic control unit 203 generates at least one power mode signal and at least one motor control current signal according to states from the frequency changer 201 and the motor 202, and is in charge of the control and communication of the power unit. The battery power system 100 comprises a battery pack B, a electrolytic capacitor C, a first contactor S1, a second contactor S2, a first switch T1, a second switch T2, a third switch T3, a ultracapacitor UC, a first diode D1, a second diode D2, a current limiting element R, an inductance element L, an electrical energy controller 101, wherein a boost converter 102 consists of the third switch T3, a second diode D2 and inductance element L. The electrical energy controller 101 coupled to the electronic control unit 203 is used for receiving the power mode signal and the motor control current signal generated from the electronic control unit 203, and the first switch T1, the second switch T2 and the third switch T3 are the metal oxide semiconductor filed effect transistors (MOSFET) or insulated gate bipolar transistors (IGBT) or GaNs. The first contactor S1 and the second contractor S2 are relay switches, and the current limiting element is a current limit resistor, current limit circuit or current limiter.

The battery pack B coupled to the electronic control unit 203, which is rechargeable battery has a battery positive terminal B1 and a battery negative terminal B2. The battery positive terminal B1 is coupled to the positive terminal 301 of the DC link and the battery negative terminal B2 is coupled to the negative terminal 302 of the DC link. The battery pack B is main storage element in the present disclosure system. The electrolytic capacitor C coupled to the battery positive terminal B1 and the battery negative terminal B2 is used to steady the voltage of the DC link 300. The first contactor S1 is coupled to the battery negative terminal B2 and the boost converter 102, and the first contactor S1 may be switched to an on-state or an off-state; the second contactor S2 is coupled to the first diode D1 and the positive terminal of the ultracapacitor UC, and the second contactor S2 may be switched to an on-state or an off-state. The first switch T1 is coupled to the battery negative terminal B2 and the negative terminal 302 of the DC link, and the first switch T1 may be switched to an on-state or an off-state; the second switch T2 is coupled to the positive terminal of the ultracapacitor UC and the first diode D1, and the second switch T2 may be switched to an on-state and an off-state. The ultracapacitor UC has a positive terminal and a negative terminal of the ultracapacitor. The positive terminal of the ultracapacitor UC is coupled to the boost converter 102 and the first contactor S1, and the negative terminal of the ultracapacitor UC is coupled to the battery negative terminal B2. The ultracapacitor UC is auxiliary storage element in the present disclosure system. The first diode D1 is coupled to the positive terminal of the ultracapacitor UC and the battery positive terminal B1. The current limiting element R is coupled to the second switch T2 and the first diode D1. The third switch T3 of the boost converter 102 serial connected with the second diode D2 is coupled to the battery negative terminal B2, and the third switch T3 may be switched to an on-state and an off-state. The second diode D2 is coupled to the battery positive terminal B1, and one terminal of the inductance element L is coupled between the third switch T3 and the second diode D2, and another terminal of the inductance element L is coupled to the first contactor S1. The voltage of the ultracapacitor is advanced by the boost converter 102, and the advanced voltage is equivalent with the voltage of the battery pack B. Thereby, the maximum voltage of the ultracapacitor used in the present disclosure may be much less than the voltage of the battery pack B, and it saves the cost of the ultracapacitor UC.

Moreover, the battery power system 100 has a first current measuring element A1, a second current measuring element A2, a first voltage measuring element V1, a second voltage measuring element V2 and the third voltage measuring element V3. The first current measuring element A1 coupled to the positive terminal of the ultracapacitor UC is used for measuring a current value of the ultracapacitor UC and generating a current signal of the ultracapacitor UC; the second current measuring element A2 coupled to the positive terminal 301 of the DC link is used for measuring a current value at the positive terminal 301 of the DC link and generating a current of the DC link; the first voltage measuring element V1 coupled to the battery positive terminal and the battery negative terminal is used for measuring a voltage value of the battery pack and generating a voltage signal of the battery pack B; the second voltage measuring element V2 coupled to the positive terminal and the negative terminal of the ultracapacitor UC is used for measuring a voltage value of the ultracapacitor UC and generating a voltage signal of the ultracapacitor; the third voltage measuring element V3 coupled between the positive terminal 301 and the negative terminal 302 of the DC link is used for measuring voltage values at the positive terminal 300 and the negative terminal 302 of the DC link and generating a voltage signal of the DC link.

Figure 2:
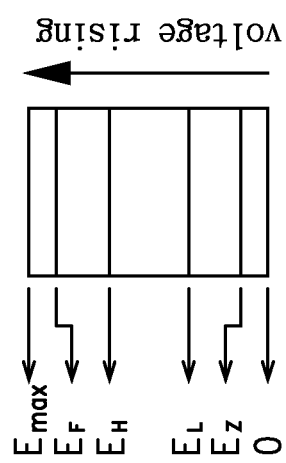
FIG. 2 illustrate a electrical power level of the ultracapacitor according to one embodiment of the present disclosure.

The power mode signal and motor control current signal generated from the electronic control unit 203 and the current signal and the voltage signal of the ultracapacitor UC, the voltage signal of the battery pack B, the current signal and the voltage signal of the DC link are transmitted to the electrical energy controller 101. The electrical energy controller 101 may analyze the electrical power level of the ultracapacitor UC according the received signals, and then the electrical energy controller 101 is enabled to control the states of the boost converter 102, the first contractor S1, the second contractor S2, the first switch T1 and the second switch T2 and the third switch T3 according the voltage signals and the current signal while using the signals to control the current directions so as to achieve a variety of control modes provided to the battery power system 100 accordingly. Please refer to FIGS. 2 and 3 with decision matrixes 1 and 2 shown below to describe the way of adjusting the control modes in the electronic energy controller 101.

Decision Matrix 1

$I_d$: the current instruction of the battery power system 100, which is decided by the electronic control unit 203, and the current direction of the current from the battery power system 100 is positive value for driving the motor system 200, and the current direction of the current flowing into the battery power system 100 is negative for recharging the battery power system 100.

$I_u$: the current measuring value of the ultracapacitor UC, which is measured by the first current measuring element A1, and the current from the ultracapacitor UC (discharge) is positive, and the current flowing into the ultracapacitor (charge) is negative.

I: the current measuring value of the DC link 300, which is measured by the second current measuring element A2, and the current from the positive terminal 301 of the DC link (discharge) is positive, and the current flowing into the positive terminal 301 of the DC link (charge) is negative.

$I_H$: the current upper limit value of the DC link 300, which is used for determining the DC current corresponding to the control mode of the power system.

$I_L$: the current lower limit value of the DC link 300, which is used for determining the DC current corresponding to the control mode of the power system.

$I_b$: the voltage of the battery pack B, which is measured by the first voltage measuring element V1.

$V_u$: the voltage of the ultracapacitor UC, which is measured by the second voltage measuring element V2.

V: the voltage of the DC link 300, which is measured by the third voltage measuring element V3.

$E_{uc}$: the residue energy of the ultracapacitor, and $E_{uc} = \frac{1}{2}(C_u V_u^2)$, $C_u$ represents the capacitance of the ultracapacitor UC.

$E_{max}$: the electronic energy limit value corresponding to the related voltage of the ultracapacitor.

$E_F$: the electronic energy high value, which is more less than the electronic energy limit value $E_{max}$.

$E_H$: the electronic energy higher value, which is smaller than the electronic energy high value $E_F$ is larger than a middle electronic energy limit value, which is $(\frac{1}{2})E_{max}$.

|  |  | Current direction is positive $I_d \geq 0$ | | |
|---|---|---|---|---|
|  |  | $I_d \leq I_L$ | $I_L \leq I_d \leq I_H$ | $I_H < I_d$ |
| electrical power level of the ultracapacitor $E_{uc}$ | $E_F \leq E_{uc} \leq E_{max}$ | Second Mode | Fourth Mode | Fourth Mode |
| | $E_H \leq E_{uc} \leq E_F$ | Second Mode | Fourth Mode | Fourth Mode |
| | $E_L \leq E_{uc} \leq E_H$ | Third Mode | Fourth Mode | First Mode |
| | $E_Z \leq E_{uc} \leq E_L$ | Third Mode | First Mode | First Mode |
| | $0 \leq E_{uc} \leq E_z$ | Third Mode | Second Mode | Second Mode |

Decision Matrix 2

|  |  | Current direction is negative $-I_d < 0$ | | |
|---|---|---|---|---|
|  |  | $-I_d \geq I_L$ | $I_L \geq -I_d \geq I_H$ | $I_H > -I_d$ |
| electrical power level of the ultracapacitor $E_{uc}$ | $E_F \leq E_{uc} \leq E_{max}$ | Sixth Mode | Sixth Mode | Sixth Mode |
| | $E_H \leq E_{uc} \leq E_F$ | Fifth Mode | Fifth Mode | Fifth Mode |
| | $E_L \leq E_{uc} \leq E_F$ | Fifth Mode | Fifth Mode | Fifth Mode |
| | $E_Z \leq E_{uc} \leq E_L$ | Fifth Mode | Fifth Mode | Fifth Mode |
| | $0 \leq E_{uc} \leq E_z$ | Fifth Mode | Fifth Mode | Fifth Mode |

Please refer to FIGS. 1-4 to describe the meanings f each signal and parameter as following:

$E_L$: the electronic energy lower value, which is smaller than the middle electronic energy limit value $(\frac{1}{2})E_{max}$.

$E_Z$: the electronic energy low value, which is smaller than the electronic energy lower value $E_L$.

Figure 3:
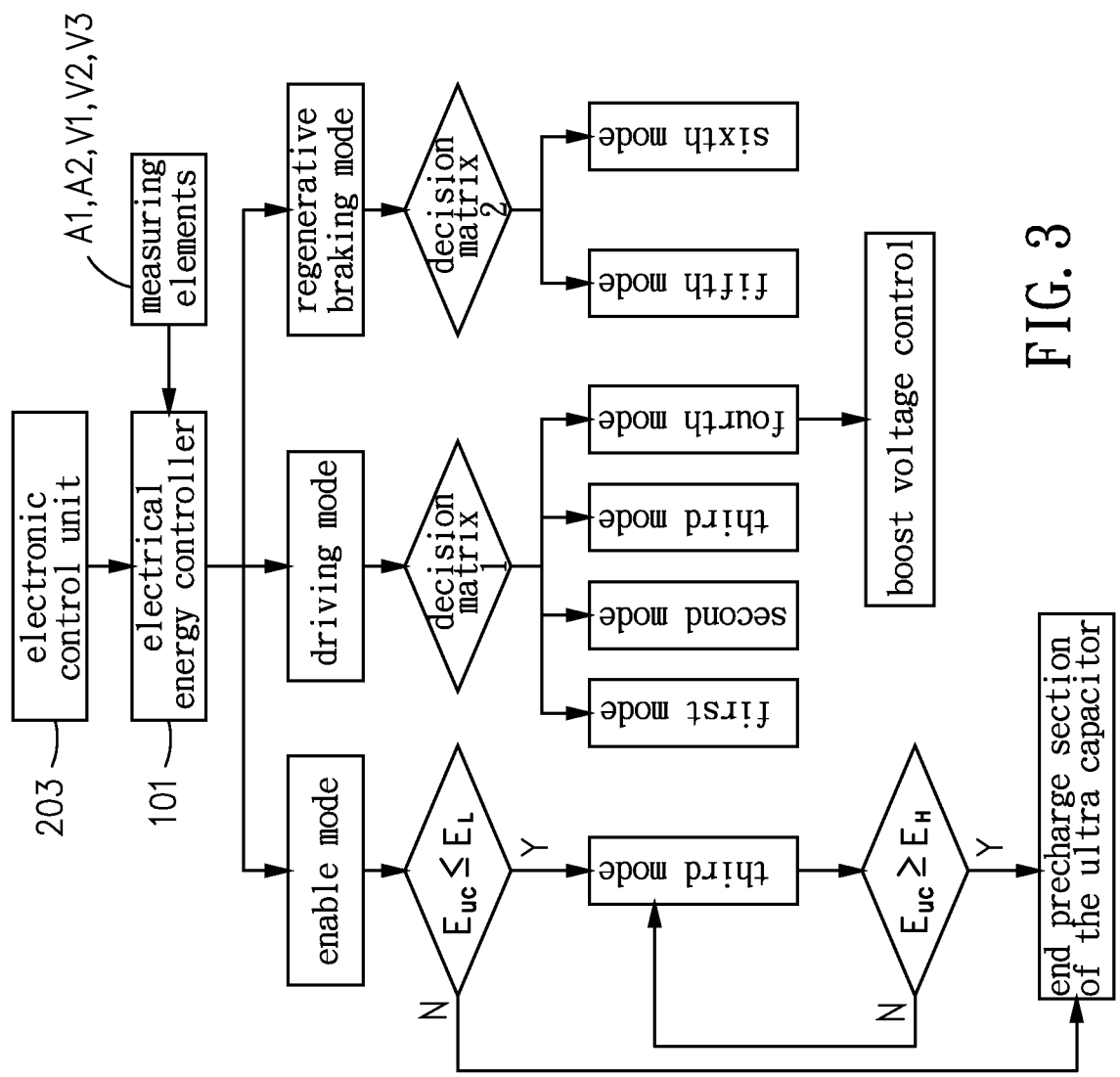
FIG. 3 illustrates a flow chart of adjusting control mode in the present disclosure.

Please refer to FIG. 3, the electronic control unit 203 uses control area network (CAN) to transfer the power mode (the power mode is a vehicle mode if the power device is an electronic vehicle) and the motor control current signal to the electronic energy controller 101, meanwhile the electronic energy controller 101 determines the power unit belong to which mode according to the voltage signal measured by the measuring elements A1, A2, V1, V2 and V3 and the current device, for example, enable mode, driving mode and regenerative braking mode in FIG. 3. Specifically, the enable mode represents a preparation state that the power unit enters into the driving mode before; the driving mode represents the motor power, which is provided by the battery pack B and the ultracapacitor UC is used for driving the power unit forward or backward; the regenerative braking mode represents performing the current instruction of the reverse drive to generate current and using the generated current to recharge the ultracapacitor UC and the battery pack B, and then determining the corresponding control mode according to the decision matrixes 1 and 2, for example, in accordance with the decision matrix 1, it represents the fourth mode if $E_L \leq E_{uc} \leq E_H$ and $I_L \leq I_d \leq I_H$. Similarly, in accordance with the decision matrix 2, it represents the fifth mode if $E_L \leq E_{uc} \leq E_H$ and $I_L \geq -I_d \geq I_H$, and so on.

Pluralities of control modes provided by the present disclosure comprise six control modes, as shown in FIGS. 4-15.

Figure 4:
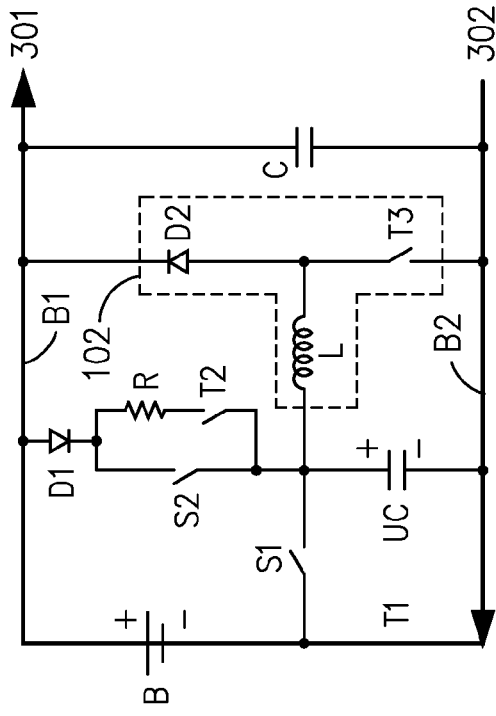
FIG. 4 illustrates a schematic diagram of the configuration and current direction of the first mode in the present disclosure.
Figure 5:
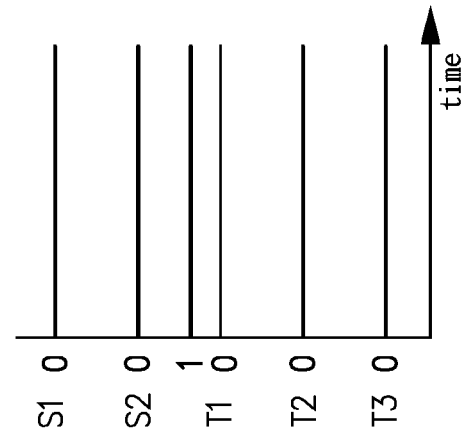
FIG. 5 illustrates a schematic diagram of the control signals of first mode in the present disclosure.

Please refer to a first mode in FIGS. 4-5, the first contractor S1 is the on-state and the second contactor S2, the first switch T1, the second switch T2 and the third switch T3 in the boost converter 102, are off-states during the first mode. The control signal of the first contactor S1 in the FIG. 5 is 1 (it represents on-state), and the control signals of the second contactor S2, the first switch T1, the second switch T2 and the third switch T3 are 0 (it represents off-state). In the first mode, the current direction (the arrow path with broad line in the FIG. 4) shows the current flows from the negative terminal 302 of the DC link to the ultracapacitor UC, and then flows to the battery pack B. Subsequently, the current flows from the battery pack B to the positive terminal 301 of the DC link, and then flows to the motor system 200 (as shown in FIG. 1). Therefore, the first mode is applicable to a case that the ultracapacitor UC is in the low-power, and further it may efficiently use residual energy.

Figure 6:
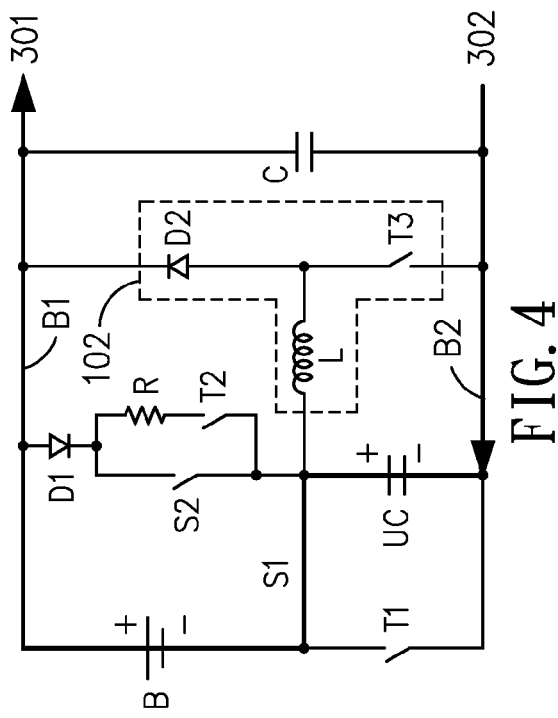
FIG. 6 illustrates a schematic diagram of the configuration and current direction of the second mode in the present disclosure.
Figure 7:
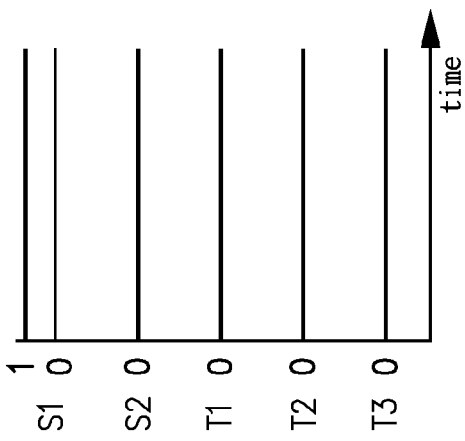
FIG. 7 illustrates a schematic diagram of the control signals of second mode in the present disclosure.

Please refer to a second mode in FIGS. 6-7, the first switch T1 is the on-state and the first contactor S1, the second contactor S2, the second switch T2 and the third switch T3 in the boost converter 102 are off-states during the second mode. The control signal of the first switch T1 in the FIG. 7 is 1 (it represents on-state), and the control signals of the first contactor S1, the second contactor S2, the second switch T2 and the third switch T3 are 0 (it represents off-state). In the second mode, the current direction (the arrow path with broad line in the FIG. 6) shows the current flows from the negative terminal 302 of the DC link to the battery pack B, and then flows to the motor system 200 (as shown FIG. 1) through the positive terminal 301 of the DC link. Therefore, the second mode is applicable to a case that the ultracapacitor UC is in the energy exhausted because it only supplies power from the battery pack B.

Please refer to a third mode in FIGS. 8-9, the first switch T1 and the second switch T2 are all the on-state, and the third switch T3 in the boost converter 102, the first contactor S1 and the second contactor S2 are the off-states during the third mode. The control signal of the first switch T1 and the second switch T2 in the FIG. 9 are 1 (it represents on-state), and the control signals of the first contactor S1, the second contactor S2, the third switch T3 are 0 (it represents off-state). In the third mode, the current direction (the arrow path with broad line in the FIG. 8) shows the current flows from the negative terminal of the DC link to the battery pack B. After the current flows across the battery pack, one part of current flows from the positive terminal 301 to the motor system 200 (as shown in FIG. 1) and another part of the current flows to the ultracapacitor UC through the switch T2. The third switch T3 uses pulse width modulation (PWM) to perform the intermittent charge in the ultracapacitor UC according to temperature of the current limiting element R. The third mode is applicable to the case that when the power unit just starts, the electronic energy of the ultracapacitor locates at the low-level, or during the power unit is being driven, it requires low power and the electronic energy level of the ultracapacitor is too lower.

Please refer to a fourth mode in FIGS. 10-11, the first switch T1 and the third switch T3 in the boost converter 102 are on-state, and the second switch T2, the first contactor S1 and the second contactor S2 are off-state. The control signal of the first switch T1 and the third switch T3 in the FIG. 11 are 1 (it represents on-state), and the control signals of the first contactor S1, the second contactor S2, the second switch T3 are 0 (it represents off-state). In the fourth mode, the current direction (the arrow path with broad line in the FIG. 10) shows the current flows from the negative terminal 302 of the DC link to the battery pack B, and then flows to the motor system 200 (as shown in FIG. 1) through the positive terminal 301 of the DC link. Before the current flows into the battery pack, one part of the current flows from the ultracapacitor UC to the boost converter 102, and the current from the boost converter 102 respectively mingles with the current flowing in the negative terminal 302 of the DC link and the current flowing from the positive terminal 301 of the DC link to the motor system 200. In the fourth mode, it uses PWM to control the first switch T1 and the third switch T3 according to the power collocation of the battery pack B and the ultracapacitor UC meanwhile the battery pack B is serial connected with the ultracapacitor. The switch T3 is used for adjusting and raising the output voltage of the ultracapacitor UC, and the first switch T1 is used for controlling the opportunity of providing the power from the battery pack B to the DC link 300 (as shown in FIG. 1) so as to achieve optimal power control result. The fourth mode is applicable to a case that the energy power level of the ultracapacitor locates at high-level, and the boost converter 102 has a good effect.

Please refer to a fifth mode in FIGS. 12-13, the second contactor S2 is the on-state, and the first contactor S1, the first switch T1, the second switch T2 and the third switch T3 in the boost converter are all the off-state. The control signal of the second contactor S2 is 1 (it represents on-state), and the control signals of the first contactor S1, the first switch T1, the second switch T2 and the third switch T3 are 0 (it represents off-state). In the fifth mode, the current direction (the arrow path with broad line in the FIG. 12) shows the current flows from the positive terminal 301 of the DC link to the ultracapacitor UC, and then flows to the motor system (as shown in FIG. 1) through the negative terminal 302 of the DC link. In the fifth mode, the ultracapacitor is charged from the positive terminal 301 of the DC link alone, and the fifth mode is applicable to the case that the regenerative braking mode and the energy level of the ultracapacitor is not high.

Please refer to a sixth mode in FIGS. 14-15, the first switch T1 is the on-state and the first contactor S1, the second contactor S2, the second switch T2 and the third switch T3 in the boost converter 102 are the off-state. The control signals of the first switch T1 is 1 (it represents on-state), and the first contactor S1, the second contractor S2, the second switch T2 and the third switch T3 are 0 (it represents off-state). In the sixth mode, the current direction (the arrow path with broad line in the FIG. 14) shows the current flows from the positive terminal 301 of the DC link to the battery pack B, and then flows to the motor system 200 (as shown in FIG. 1) through the negative terminal 302 of the DC link. In the sixth mode, the battery pack B is charged from the positive terminal 301 of the DC link, and the fifth mode is applicable to the case that the regenerative braking mode and the energy level of the ultracapacitor is higher.

In conclusion, the battery power system and method provided by the present disclosure uses the ultracapacitor and the power device with the lithium-ion cell to deign a new circuit used to switch to a circuit with serial connected structure or a circuit with parallel connected. The battery power system detects the voltages of the battery pack and the ultracapacitor to perform the current adjustment, and control the discharge and charge according to a variety of states, such as, the discharge requirement of the electronic vehicles with power unit when the power unit is driven, and the regenerative braking, so as to achieve high-effectively sharing of the load current, decrease the discharge depth of the battery and extend battery life.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A battery power system adapted for driving a motor system of a power unit with respect to at least one power mode signal and at least one motor control signal generated from the motor system, the battery power system comprising:
    a battery pack, having a battery positive terminal coupled to a positive terminal of a direct current (DC) link and a battery negative terminal coupled to a negative terminal of the direct current (DC) link, and the battery pack is a rechargeable battery, and the battery positive terminal and the battery negative terminal are electrically coupled to the motor system;
    an electrolytic capacitor, coupled to the battery positive terminal and the battery negative terminal;
    a boost converter, coupled the battery positive terminal and the battery negative terminal, for boost converting the power;
    a first contactor, coupled to the battery negative terminal and the boost converter, and the first contactor has an on-state and an off-state;
    a first switch, coupled to the battery negative terminal and the negative terminal of the DC link, and the first switch has an on-state and an off-state;
    an ultracapacitor, having a positive terminal and a negative terminal, and the positive terminal of the ultracapacitor is coupled to the boost converter and the negative terminal of the ultracapacitor is coupled to the battery negative terminal;
    a first diode, coupled the positive terminal and the negative terminal of the ultracapacitor;
    a second contactor, coupled to the first diode and the positive terminal of the ultracapacitor, and the second contactor has an on-state and an off-state;
    a second switch, coupled to the first diode and the positive terminal of the ultracapacitor, and the second switch has an on-state and an off-state;
    a current limiting element, coupled to the second switch and the first diode;
    a plurality of measuring elements, for measuring at least one voltage value and at least one current value, and generating at least one voltage signal and at least one current signal; and
    a electrical energy controller, for receiving the power mode signal, the motor control signal, the voltage signal and the current signal, and analyzing the electrical power level of the ultracapacitor according the power mode signal, the motor control signal and the voltage/current signals generated from the plural measuring elements while using the result of the analysis to control the current directions and conductivity of the boost converter, the first contactor, the second contactor, the first switch and the second switch so as to achieve a variety of control modes accordingly.

2. The battery power system of claim 1, wherein the boost converter comprises a third switch, a second diode and an inductance element, and the third switch is serial connected with the second diode and coupled to the battery negative terminal, and the second diode is coupled to the battery positive terminal, and one terminal of the inductance element is coupled between the third switch and the second diode and another terminal of the inductance element is coupled to the first contactor, and the third switch has an on-state and an off-state.

3. The battery power system of claim 2, wherein the first switch, the second switch and the third switch are metal oxide semiconductor filed effect transistors (MOSFET) or insulated gate bipolar transistors (IGBT) or GaNs.

4. The battery power system of claim 1, wherein the first contactor and the second contractor are relay switches.

5. The battery power system of claim 1, wherein the current limiting element is a current limit resistor, current limit circuit or current limiter.

6. The battery power system of claim 1, wherein the power unit comprises a frequency changer, a motor and an electronic control unit, and the frequency changer is coupled to the motor, the electronic control unit, the positive terminal and the negative terminal of the DC link, and then transfers the power mode signal and the motor control signal to the electrical energy controller.

7. The battery power system of claim 1, wherein the plurality of measuring elements further comprises:
    a first current measuring element, coupled to the positive terminal of the ultracapacitor, for measuring a current value of the ultracapacitor and generating a current signal of the ultracapacitor;
    a second current measuring element, coupled to the positive terminal of the DC link, for measuring a current value at the positive terminal of the DC link and generating a current of the DC link;
    a first voltage measuring element, coupled to the battery positive terminal and the battery negative terminal, for measuring a voltage value of the battery pack and generating a voltage signal of the battery pack;
    a second voltage measuring element, coupled to the positive terminal and the negative terminal of the ultracapacitor, for measuring a voltage value of the ultracapacitor and generating a voltage signal of the ultracapacitor; and
    a third voltage measuring element, coupled between the positive terminal and the negative terminal of the DC link, for measuring voltage values at the positive terminal and the negative terminal of the DC link and generating a voltage signal of the DC link;

wherein the electrical energy controller receives the voltage signals of the battery pack, the ultracapacitor, the DC link and the current signal of the DC link, and the electrical energy controller is enabled to control the states of the boost converter, the first contractor, the second contractor, the first switch and the second switch according the voltage signals and the current signal while using the signals to control the current directions so as to achieve a variety of control modes accordingly.

8. The battery power system of claim 1, wherein the control modes comprise a first mode, and the first contractor is the on-state and the boost converter, the second contactor, the first switch and the second switch are the off-states during the first mode, meanwhile the current direction is controlled to flow from the negative terminal of the DC link to the battery pack through the ultracapacitor, and then flow from the positive terminal to the motor system.

9. The battery power system of claim 1, wherein the control modes comprise a second mode, and the first switch is on-state and the boost converter, the first contactor, the second contactor and the second switch are the off-states during the second mode, meanwhile the current direction is controlled to flow from the negative terminal of the DC link to the battery pack, and then flow from the positive terminal of the DC link to the motor system.

10. The battery power system of claim 1, wherein the control modes comprise a third mode, and the first and second switches are the on-states and the boost converter, the first contactor and the second contactor are the off-states during the third mode, meanwhile the current direction is controlled to flow from the negative terminal of the DC link to the battery pack, wherein a part of current flows from the positive terminal of the DC link to the motor system, and another part of current flows to the ultracapacitor through the second switch after the current flow through the battery pack.

11. The battery power system of claim 1, wherein the control modes comprises a fourth mode, and the first switch and the boost converter are the on-states and the second switch, the first contactor and the second contactor are the off-states during the fourth mode, meanwhile the current direction is controlled to flow from the negative terminal of the DC link to the battery pack, and then flow from the positive terminal of the DC link to the motor system, wherein a part of current flows to the boost converter through the ultracapacitor, and the current from the boost converter respectively mingles with the current flowing in the negative terminal of the DC link and the current flowing from the positive terminal of the DC link to the motor system.

12. The battery power system of claim 1, wherein the control modes comprise a fifth mode, and the second contactor is the on-state and the boost converter, the first switch, the second switch and the first contactor are the off-state during the fifth mode, meanwhile the current direction is controlled to flow from the positive terminal of the DC link to the ultracapacitor, and then flows from the negative terminal of the DC link to the motor system.

13. The battery power system of claim 1, wherein the control modes comprise a sixth mode, and the first switch is the on-state and the boost converter, the first contactor, the second contactor and the second switch are the off-states during the sixth mode, meanwhile the current direction is controlled to flow from the positive terminal of the DC link to the battery pack, and then flows from the negative terminal of the DC link to the motor system.

\* \* \* \* \*